Dec. 25, 1962  F. V. FORSS ET AL  3,070,705
CONTROL SYSTEM FOR PRIME-MOVER DYNAMO PLANTS
Filed June 29, 1961
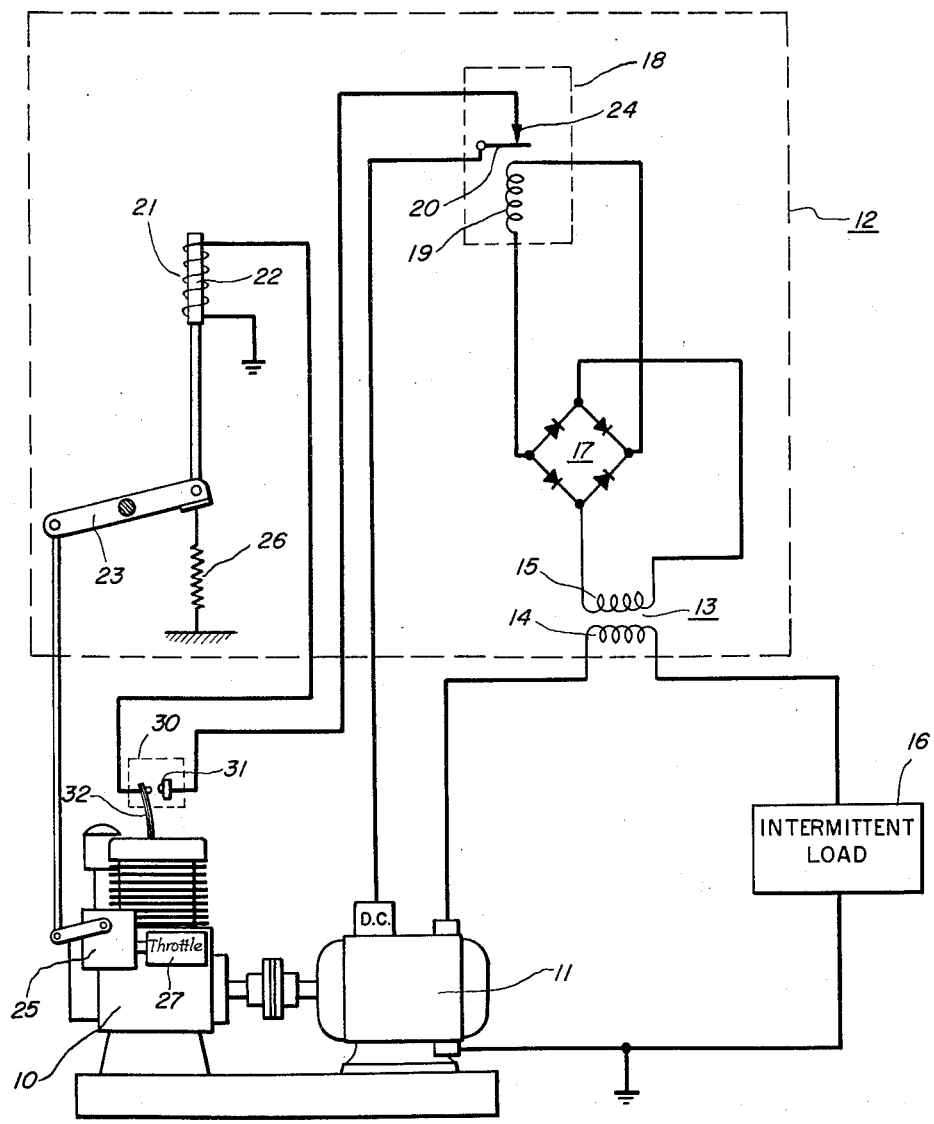
Inventors
Fritz V. Forss
Robert F. Weinig
By Francis W. Crotty
Atty.

3,070,705
CONTROL SYSTEM FOR PRIME-MOVER DYNAMO PLANTS
Fritz V. Forss, South Sioux City, Nebr., and Robert F. Weinig, Sioux City, Iowa, assignors to Wincharger Corporation, a corporation of Minnesota
Filed June 29, 1961, Ser. No. 120,788
4 Claims. (Cl. 290—40)

This invention relates, in general, to engine-generator units and is directed in particular to a temperature responsive control system for controlling the operating speed of the engine.

In many instances where engine-generator units are employed as auxiliary or stand-by power supplies they must operate on an intermittent basis since the demand upon the generator varies. In certain installations it is desired for the sake of economy to change the speed of the engine automatically between an idling speed under the conditions of no load, to a higher speed to provide a substantial power output from the generator under operating load conditions. A control arrangement responsive to the demand imposed upon the generator is therefore required in order to match the speed of the drive engine to this demand.

A known control arrangement for use with engine-generator units comprises a circuit which responds to the current drawn from the generator to energize a solenoid controlling the throttle setting of the engine. Generally, the speed control arrangement is designed to respond to impressed loads greater than a predetermined minimum value.

While this feature is most desirable, the operation of a cold engine tends to impose problems on this type of control system. More specifically, when the engine is initially started it is desirable to have it run at operating speed to raise the temperature of the engine to a predetermined value. This is necessary because cold engines have a tendency to stall when running at idle speeds and those cold engines that do run at an idle speed encounter difficulty when the load responsive system attempts to increase the speed under load.

It is therefore an object of this invention to provide a new and improved control system for use with an engine-generator and which overcomes the aforementioned difficulties.

It is also an object of this invention to provide a new and improved temperature sensitive control system which prevents the load responsive system from controlling the engine speed until such time as the engine has reached a predetermined operating temperature.

In accordance with the invention, there is provided an electrical power generating plant including a thermostatic device which prevents the engine or prime mover from stalling before it has reached a predetermined operating temperature. The electrical power generating plant comprises an electrical generator for producing electrical power and an engine or prime mover coupled to the generator for driving it at selected speeds, including an operating speed and an idling speed. The power plant further comprises speed control means tending to run the prime mover at idling speed but responsive to the application of an electrical load for increasing the speed of the prime mover from idling speed to its operating speed. Also included in the power generator plant are means, responsive to the operating temperature of the prime mover, for rendering the speed control means ineffective when the operating temperature is less than a predetermined value in order to enable the prime mover to drive the generator at the operating speed in the absence of any load.

The features of this invention which are believed to be novel are set forth with particularity in the appended claims. The invention, together with further objects and advantages thereof, may best be understood, however, by reference to the following description taken in conjunction with the accompanyig drawing, in which the single FIGURE illustrates the control system of the invention in combination with an engine-generator unit.

The illustrated engine-generator comprises a prime mover or engine 10 mechanically coupled to a generator 11. The engine includes a speed governor 25 coupled to an engine throttle 27 tending to maintain such an operating speed that the generator produces a rated terminal voltage. However, a speed control arrangement 12 is provided to override the governor in the absence of a load on the generator of such magnitude that rated output cannot be maintained at idling speed. At the same time this speed control yields to the governor to permit a change in speed of engine 10 from idling to an operating speed in response to the application of a load 16 of such value that rated output voltage from the generator requires the increased speed. This arrangement comprises a current transformer 13 having a primary winding 14 connected with load 16 and a secondary winding 15 connected in series with a bridge rectifier 17. A relay 18, including an energizing coil 19, is connected across the output terminals of rectifier 17. Relay 18 comprises a movable contact 20 electrically connected to the exciter portion of generator 11 to obtain therefrom a direct current (D.C.) potential and a fixed contact 24 conductively connected to one end of a solenoid 21 by way of a thermostatic device 30 which will be explained more fully hereinafter. The other end of solenoid 21 is connected to the D.C. exciter system of the generator through a common ground.

A plunger 22, receivable within solenoid 21, is rigidly fixed to one end of a pivoted bellcrank 23 which is biased in a clockwise direction by a spring 26. The other end of crank 23 is mechanically coupled to speed governor 25 of engine 10. Contacts 20, 24 are normally closed as shown to energize solenoid 21 if the electrical contacts of device 30 are in their closed position, to override the governor and enforce idling speed on the engine.

Thermostatic device 30 comprises a contact pair 31 and a conventional temperature sensitive bimetallic strip 32 similar to that found in ordinary thermostats. Strip 32 is in physical contact with the engine, preferably in close proximity to the cylinder block to respond to the operating temperature of the engine. One contact of pair 31 is affixed to strip 32, while the other is affixed to some stationary portion of the engine. When the temperature of the engine achieves a predetermined value, strip 32 of the thermostat flexes or changes position to bring the contact associated with it into operative relationship with the stationary contact of pair 31. Of course, during intervals in which the engine temperature is below its operating or warmed up value, strip 32 assumes the position shown in which contact pair 31 is open.

In describing the operation of the motor generator engine 10 will be assumed initially to be operating at its idling speed and will also be assumed to have attained its normal running temperature. For these conditions, contact pair 31 of thermostat 30 is closed and the output current of generator 11 is insufficient to energize coil 19 and open the circuit to solenoid 21. Accordingly, solenoid 21 is energized and crank 23 is displaced in a counterclockwise direction against the influence of spring 26. Thus, crank 23 overrides governor 25 or renders it ineffective in order to maintain engine 10 at idling speed.

When a load is drawn from generator 11 requiring increased engine speed to maintain rated terminal voltage, speed control 12 permits governor 25 to function. More particularly, when primary winding 14 of transformer 13 carries such a load current, the energy developed in secondary winding 15 and rectified by rectifier 17 energizes coil 19. Relay 18, upon energization of coil 19, breaks contacts 20 and 24 to de-energize solenoid 21 and release plunger 22. Bellcrank 23, under the influence of biasing spring 26, thereby permits governor 25 to take over. In consequence, engine 10 accelerates to the operating speed and the load is accommodated without loss of terminal voltage.

In brief, control arrangement 12 and governor 25 assure that the engine runs at operating speed at all times when the load condition requires such speed to maintain rated voltage. At all other times, the engine idles. However, as previously mentioned, it is desirable to initially run the engine at operating speed until such time as it sufficiently warms up to prevent stalling or stopping at idling speed. This is accomplished by thermostat 30 which opens contact pair 31 so that solenoid 21 is de-energized irrespective of the conditions of relay 18 as long as the temperature of engine 10 is less than its operating value. Once the engine temperature has reached its normal operating value, which is sufficient to insure that the engine 10 will run smoothly at idling speed and will not stall, thermostat 30 closes contact pair 31 and the control of the speed of the engine is returned to control arangement 12.

The invention thus provides a new and novel control system for an engine-generator power plant. More specifically, the control system incorporates a thermostatic device to prevent the engine from stalling or stopping prior to the time it reaches a predetermined operating temperature.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

We claim:

1. An electrical power generator plant comprising: an electrical generator for producing electrical power; a prime mover coupled to said generator for driving it at selected speeds, including an operating speed and an idling speed; speed control means tending to run said prime mover at said idling speed but responsive to the application of an electrical load to said generator for increasing the speed of said prime mover from said idling speed to said operating speed; and means, responsive to the operating temperature of said prime mover, for rendering said speed control means ineffective when said operating temperature is less than a predetermined value to enable said prime mover to drive said generator at said oprating speed in the absence of load.

2. An electrical power generator plant comprising: an electrical generator for producing electrical power; a prime mover coupled to said generator for driving it at selected speeds, including an operating speed and an idling speed; means for governing the speed of said prime mover to drive said generator at said operating speed; control means tending to render said governing means ineffective and to run said prime mover at said idling speed but responsive to the application of an electrical load to said generator for rendering said governing means effective and increasing the speed of said prime mover from said idling speed to said operating speed; and means, responsive to the operating temperature of said prime mover, for rendering said control means ineffective when said operating temperature is less than a predetermined value to enable said governing means to run said prime mover at said operating speed in the absence of load.

3. An electrical power generator plant comprising: an electrical generator for producing electrical power; a prime mover, including a throttle, coupled to said generator for driving it at selected speeds, including an operating speed and an idling speed; a governor coupled to said throttle for controlling the speed of said prime mover to run it at said operating speed; control means coupled to said governor to render it ineffective and tending to run said prime mover at said idling speed but responsive to the application of an electrical load to said generator for rendering said governor effective and increasing the speed of said prime mover from said idling speed to said operating speed; and thermostatic means, included in said control means, responsive to the operating temperature of said prime mover for rendering said control means ineffective when said operating temperature is less than a predetermined value to enable said governor to control said prime mover in the absence of load.

4. An electrical power generator plant comprising: an electrical generator for producing electrical power; a prime mover, including a throttle, coupled to said generator for driving it at selected speeds including an operating speed and an idling speed; a governor coupled to said throttle for controlling the speed of said prime mover to run it at said operating speed; solenoid means coupled to said governor for rendering said governor ineffective and for imposing idling speed on said prime mover; circuit means for energizing said solenoid in the absence of an electrical load connected to said generator but responsive to the application of an electrical load to said generator for de-energizing said solenoid and rendering said governor effective to increase the speed of said prime mover from said idling speed to said operating speed; and a thermostatic device coupled to said solenoid means and responsive to the operating temperature of said prime mover for electrically disabling said solenoid means when said operating temperature is less than a predetermined value to enable said governor to control said prime mover in the absence of load.

No references cited.